US006983619B2

(12) United States Patent
Hille et al.

(10) Patent No.: US 6,983,619 B2
(45) Date of Patent: Jan. 10, 2006

(54) BUS ROOFTOP CONDENSER FAN

(75) Inventors: Andreas Hille, Renningen (DE); Robert C. Reimann, LaFayette, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 299 days.

(21) Appl. No.: 10/429,453

(22) Filed: May 5, 2003

(65) Prior Publication Data

US 2004/0221595 A1 Nov. 11, 2004

(51) Int. Cl.
*B60H 1/32* (2006.01)

(52) U.S. Cl. ........................... 62/244; 62/291; 62/428; 62/507; 62/DIG. 16

(58) Field of Classification Search .......... 62/428–429, 62/507–508, DIG. 16, 285–291
See application file for complete search history.

(56) References Cited

U.S. PATENT DOCUMENTS

| | | | | |
|---|---|---|---|---|
| 3,301,003 | A * | 1/1967 | Laing | 62/324.5 |
| 3,662,557 | A * | 5/1972 | Morgan | 62/279 |
| 3,785,168 | A * | 1/1974 | Domingorene | 62/455 |
| 5,005,372 | A * | 4/1991 | King | 62/244 |
| 5,184,474 | A * | 2/1993 | Ferdows | 62/244 |
| 5,220,808 | A * | 6/1993 | Mayer | 62/244 |
| 6,295,826 | B1 * | 10/2001 | Lee | 62/244 |
| 6,543,244 | B1 * | 4/2003 | Amr | 62/239 |

* cited by examiner

*Primary Examiner*—William E. Tapolcai
(74) *Attorney, Agent, or Firm*—Wall Marjama & Bilinski LLP

(57) ABSTRACT

A module is provided for attachment to the roof of a bus and includes all of the necessary components for conditioning the return air from the passenger compartment and delivering conditioned air thereto. Each module may include an evaporator section, a condenser section and a power section including a compressor and an inverter. The condenser section includes a condenser coil and a transverse fan with its axes disposed horizontally so as to draw air through a fresh air intake opening, through the coil and out a condenser discharge opening. The drain pan is shaped so as to form an air guiding wall around the fan, and a vortex wall is attached to the condenser coil support structure to separate low and high pressure sides of the fan. A rear wall and the fins of a discharge grill are angled with respect to the vertical plane so as to thereby prevent a recirculation of hot discharged air back into the air intake opening.

9 Claims, 6 Drawing Sheets

BUS ROOFTOP CONDENSER FAN

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus.

In the condenser section of a bus rooftop air conditioner, it has been common practice to use one or more propeller fans for circulating outdoor air through the condenser coil. This is normally accomplished by installing the condenser fan(s) with its axis oriented vertically, and with the fan then drawing air through the condenser coil and discharging it upwardly. This approach has been recognized by the applicants as problematic for a number of reasons. First, the vertical orientation of the fan, together with its drive motor, severely limits the degree in which the vertical height can be reduced. Secondly, the fan drive motor is necessarily within the hot condenser air stream, thereby reducing it reliability. Further, such condenser fan motor installations are difficult to reach for purposes of serviceability. Also the propeller fans tend to be noisy. Finally, because of the relatively low profile unit aspect ratio, there tends be an unequal air flow distribution to the condenser coil.

It is therefore an object of the present invention to provide an improved bustop air conditioning system.

Another object of the present invention is the provision in a bus air conditioner for condenser section that is relatively quiet and has a pleasing profile to an observer.

Yet another object of the present invention is the provision for reducing the manufacturing, installation, and maintenance costs of a bus air conditioning system.

Still another object of the present invention is the provision in a bustop air conditioner for limiting the vertical height of the condenser section thereof.

Another object of the present invention is the provision in a bustop air conditioner for a condenser fan motor installation that is reliable in service and easily accessed for purposes of serviceability.

Still another object of the present invention is the provision in a bustop air conditioner for providing uniform air flow distribution through the condenser coil.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air supply air ducts on a bus.

In accordance with another aspect of the invention, a plurality of modules can be installed on the roof of a bus, with each pair being in back-to-back relationship near the longitudinal center line of the bus.

By yet another aspect of the invention, the modules may include a compressor, such that all the necessary refrigerant piping is located entirely on the module, with electrical power being provided to the electrical components on the module from a motor driven generator.

As still another aspect of the invention, a transverse fan is disposed downstream of the condenser coil, with its axis oriented horizontally so as to draw air through the condenser coil and discharge it upwardly through the unit.

By yet another aspect of the invention, the structure surrounding the transverse fan is installed such that the flow exiting the transverse fan is orientated in a direction away from the condenser fresh air intake to avoid recirculation.

In the drawings as hereinafter described, a preferred embodiment is depicted; however various other modifications and alternate constructions can be made thereto without departing from the true sprit and scope of the invention.

DESCRIPTION OF THE PREFERRED EMBODIMENT

Figure 1:
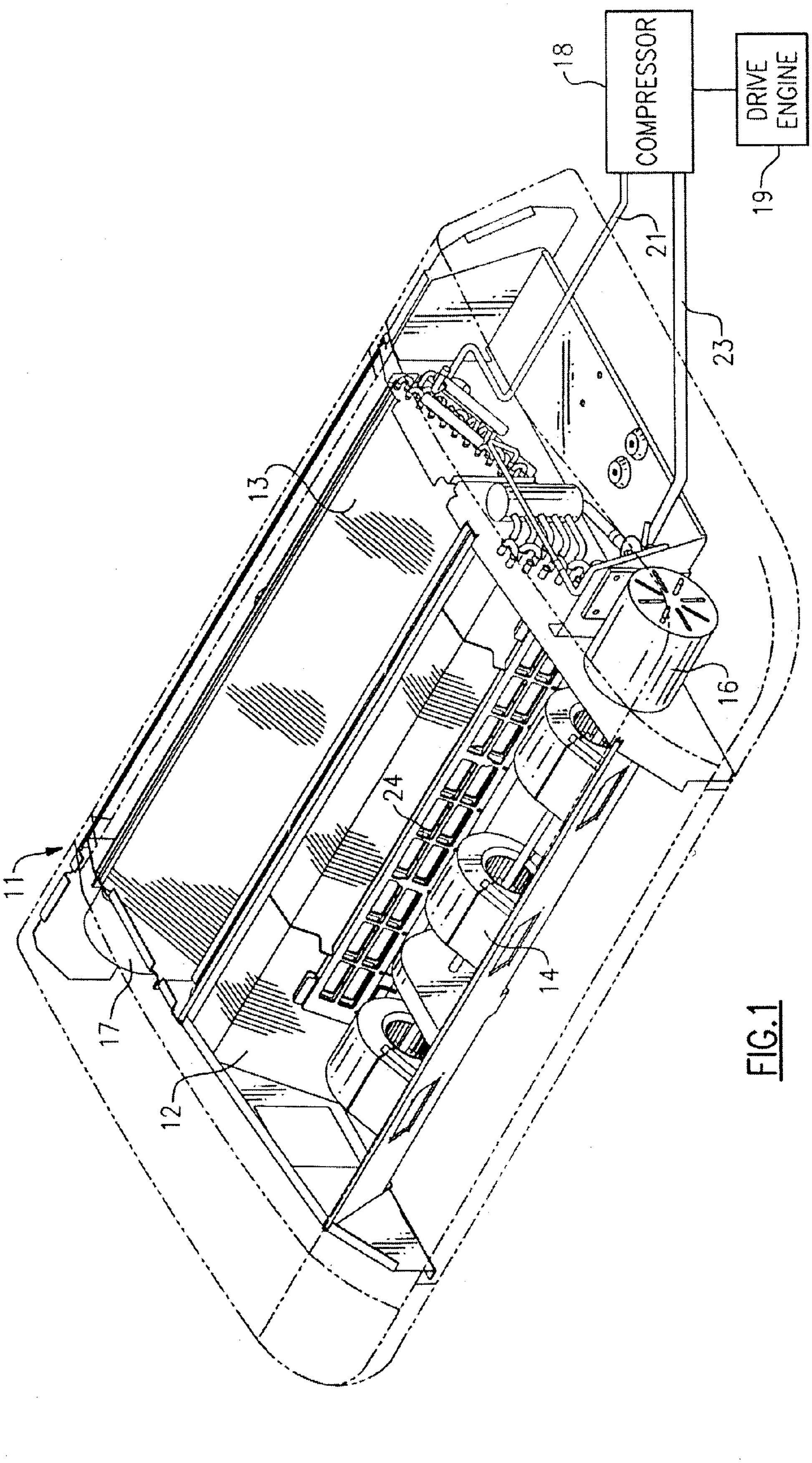
FIG. 1 is a perspective view of a module in accordance with a preferred embodiment of the invention.

FIG. 1 shows a module 11 with the cover removed to show the various components including an evaporator coil 12, a condenser coil 13, a plurality of evaporator blowers 14 and associated drive motor 16, and a condenser fan motor 17 for driving a condenser fan.

Outside the module 11 is a compressor 18 which is driven by a motor drive 19 to pump refrigerant from the compressor 18 through refrigerant line 21 to the condenser coil 13 and eventually to the evaporator coil 12 by way of an expansion valve 22 (not shown). The refrigerant vapor then passes back to the compressor 18 by way of refrigerant line 23.

Also shown in FIG. 1 is an electrical resistance heater 24 which is downstream of the evaporator coil 12 such that, for periods of heating, the air is drawn by the evaporator blower 14 through the evaporator coil 12 and the heater 24 such that the air being delivered to the passenger compartment of the bus is heated. The electrical power to the heater 24, as well as to the evaporator blower motor 16 and the condenser fan motor 17, are provided by way of an electrical line receiving electrical power from a generator or the like, which in turn is driven by the drive motor 19. The heater 24 can be powered by either DC or AC currents with the heat output being independent of the speed of the drive engine. With the module as shown in FIG. 1, DC power is available to power all of the motor components and is therefore preferred for the heater 24.

Figure 2:
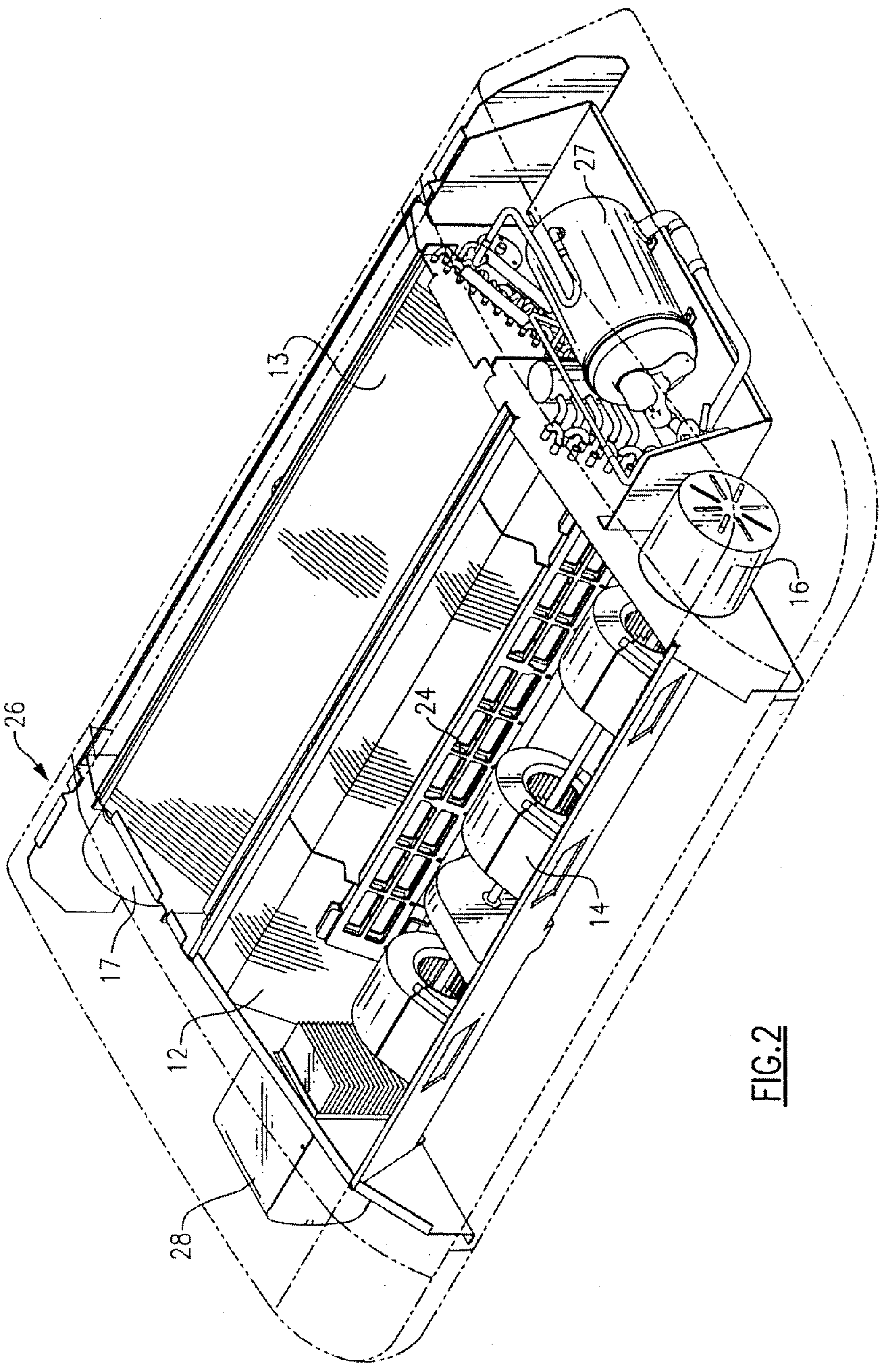
FIG. 2 is an alternative embodiment of the invention to include a compressor.
Figure 3:
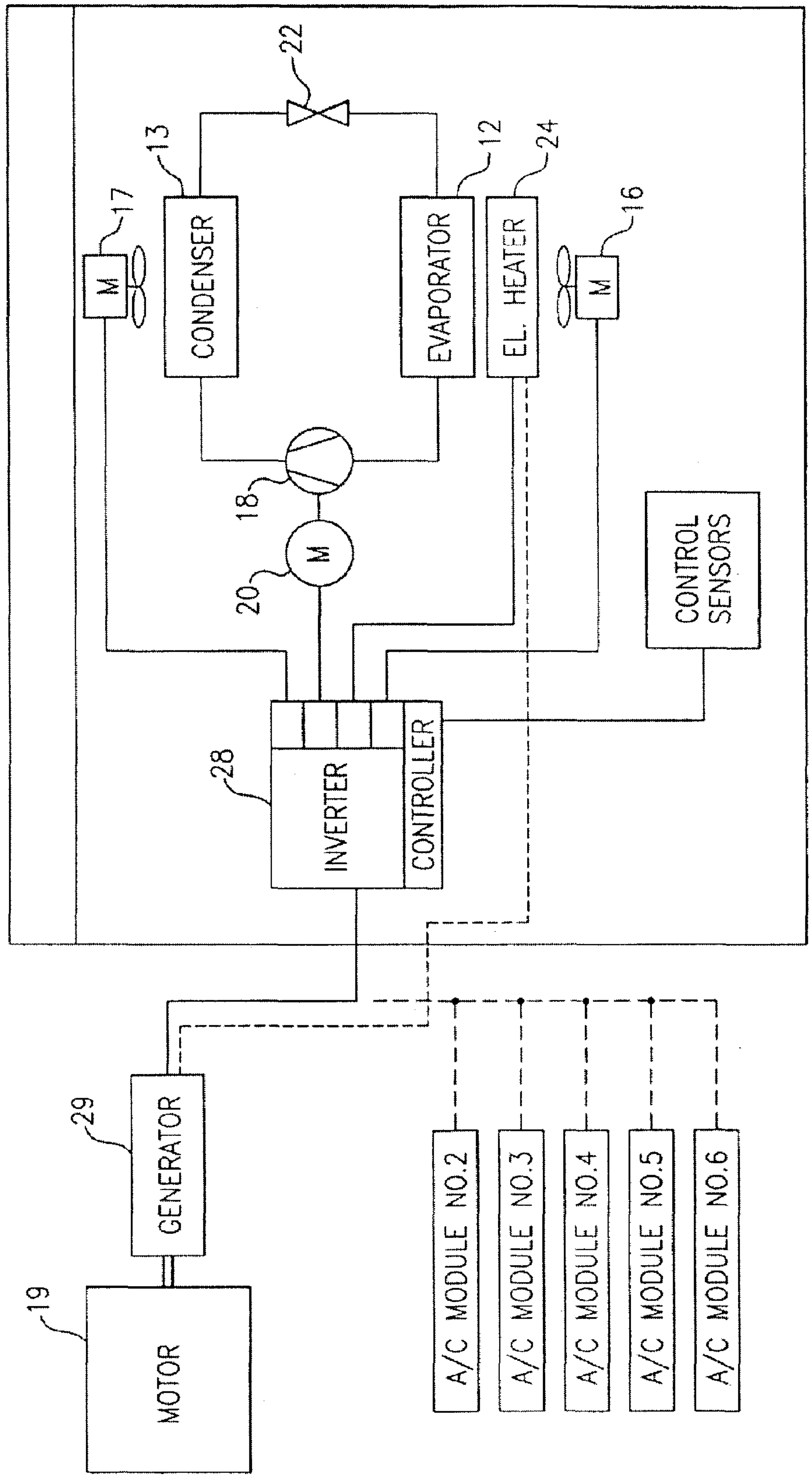
FIG. 3 is a schematic illustration of both a refrigeration circuit and an electrical circuit within a module in accordance with the present invention.

Referring now to FIG. 2, a modified module 26 is shown to include all of the components as described hereinabove. Further, it includes a horizontal rotary compressor 27 which is operatively interconnected between the evaporator coil 12 and the condenser coil 13 so as to circulate refrigerant in a manner similar as described hereinabove. The difference over the earlier described system, however, is that the hermetic compressor 27 is driven by an internal electric motor 20, with the power being provided by way of the generator 29, driven by the main engine 19, and an invertor/controller 28 as shown in FIG. 3. The invertor/controller 28, which receives inputs from various control sensors 30 and which includes a rectifier and an inverter, receivers AC power from a generator or alternator 29 and provides, by way of the inverter, controlled AC power to the evaporator blower motor 16, the condenser blower motor 17, the compressor drive motor 20 and the heater 24 or, alternatively the heater may be powered by the generator shown by the dotted line of FIG. 3. Since the invertor/controller 28 is capable of providing controlled AC power, each of the motors are AC motors, thereby ensuring a more maintenance free system.

With the inverter/controller providing controlled AC power, a preferred type of heat 24 is a positive temperature coefficient (PTC) heater wherein electrical resistance increases relatively fast as the temperature increases. Whereas this type of heater is relatively expensive in it initial installation, it acts as a self limiter and does not require a thermostat to maintain a safe temperature limit.

Figure 4:
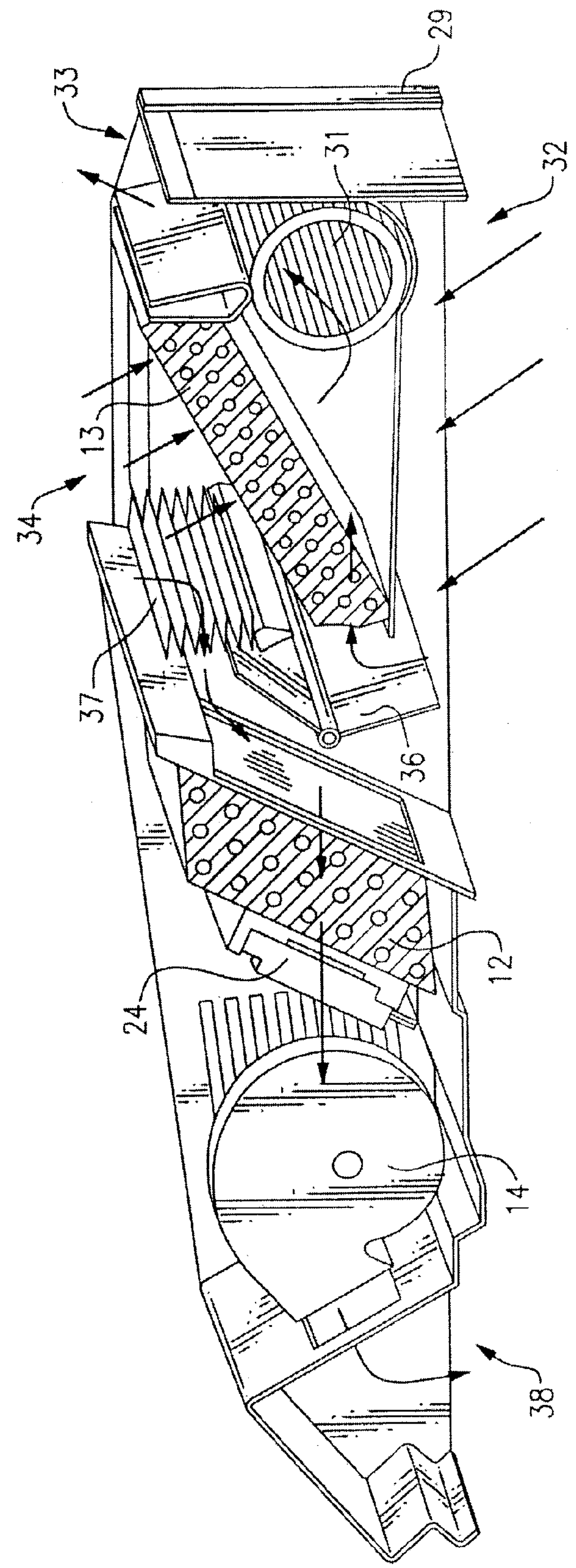
FIG. 4 is a cut away perspective view of a module in accordance with a preferred embodiment of the invention.

Referring now to FIG. 4, the module is shown with the various components as described hereinabove enclosed within a housing 29 and including a condenser fan 31. Also shown are various openings in the housing 29, including a return air opening 32, a condenser outlet opening 33 and a condenser/fresh air intake opening 34. A fresh/return/exhaust air flap 36 is provided between the condenser coil 13 and the evaporator coil 12 to control the mix of air passing to the evaporator coil 12, depending on the particular demands of the system, as well as the existing ambient conditions. The air flow pattern, as indicated by the arrows, is thus controlled by the condenser fan 31, the evaporator fan 14 and the position of the air flap 36. As the return air enters the return air opening 32, it is caused to flow out the condenser outlet air opening and/or through the evaporator coil 12 depending on the position of the air flap 36. Similarly, the fresh air coming in the intake opening 34 passes through the condenser coil 13 and then out the condenser outlet air opening 33 and/or, depending on the position of the air flap 36, it is allowed to pass through the evaporator coil 12. Thus, with the use of the air flap 36 it is possible to have all of the return air pass through the condenser air outlet opening 33, with all fresh air passing into the air intake opening 34 and then through the evaporator coil 12, or when the flap 36 is placed in the other extreme position, all the return air passes through the evaporator coil 12 and all of the fresh air entering the air intake opening 34 passes through the condenser coil 13 and out the condenser outlet air opening 33. A more likely operating condition, however, is an intermediate position of the air flap 36 wherein a selective mix of return air and fresh air are passed through the evaporator coil 12.

As will be seen, a filter 37 is positioned in the air flow stream which enters the fresh air intake opening 34 and passes through the evaporator coil 12. Its purposes is to filter out any debris that may be in the air stream entering the air intake opening 34. After passing through the evaporator coil 12, the conditioned air is caused to flow by the evaporator blower 14 out a supply air opening 38 as shown.

Figure 5A:
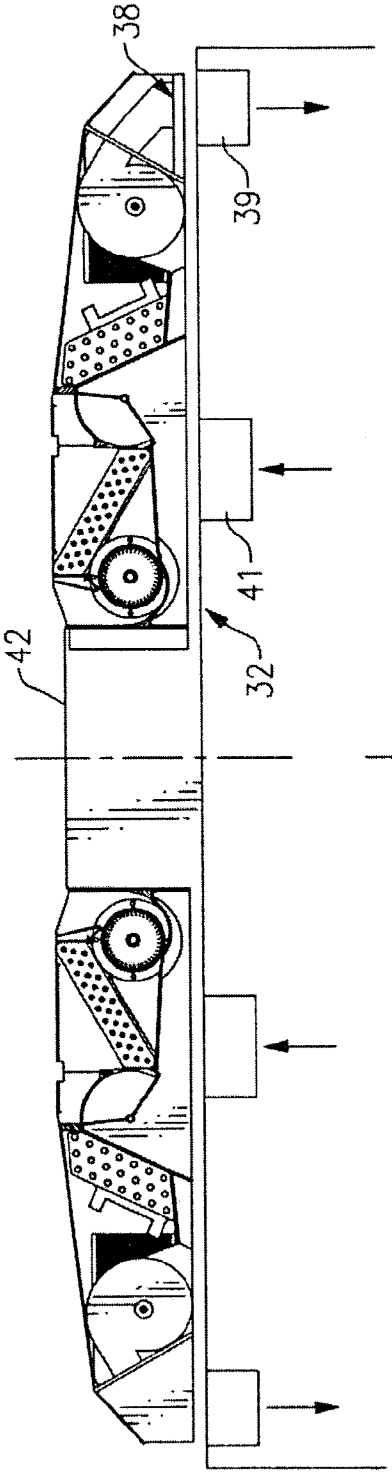
FIG. 5A–5C are sectional views of modules as applied to various types of bus installations in accordance with a preferred embodiment of the invention.
Figure 5B:
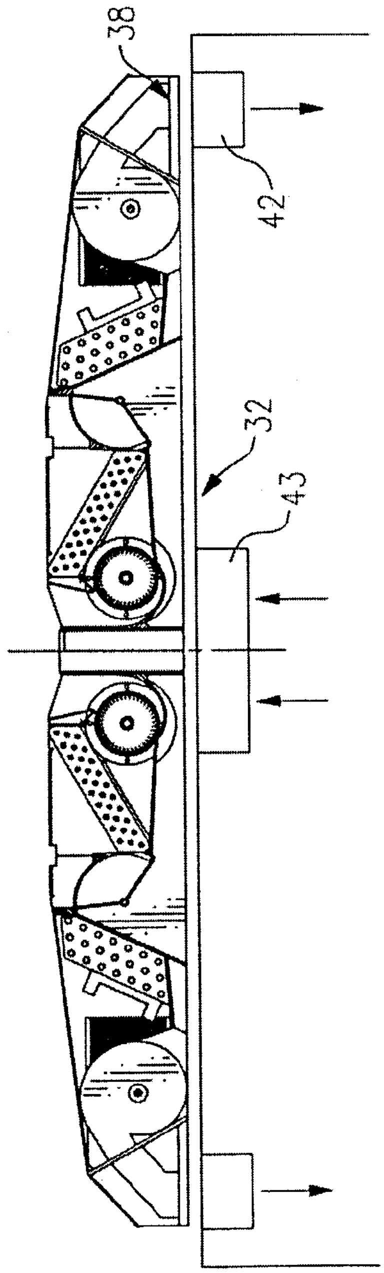
Figure 5C:
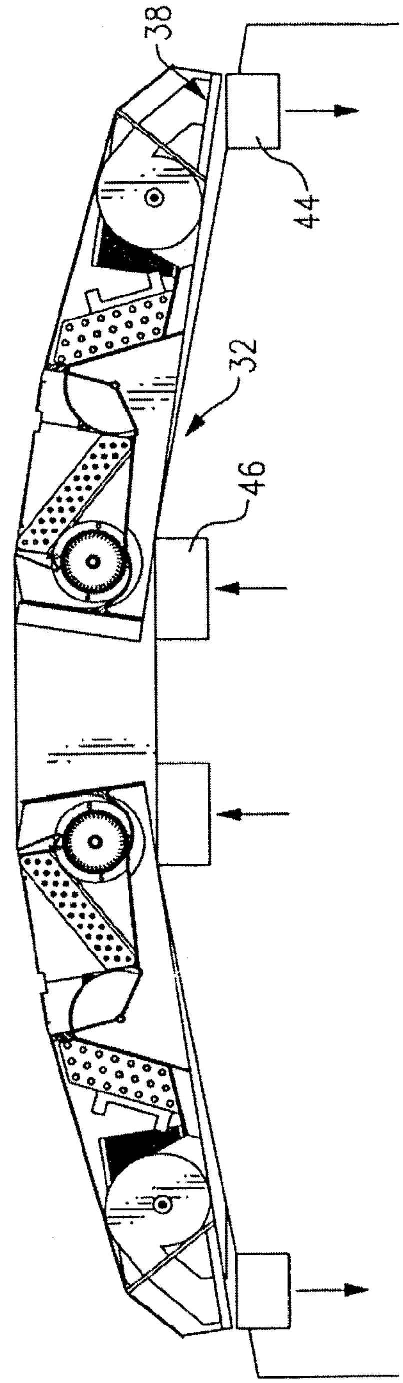

Considering now the manner in which the module 11 is positioned on the rooftop in such a way as to interface with the existing air path openings on the rooftop, reference is made to FIGS. 5*a*–5*c*. As will be seen, the position of the various openings on a bus can vary substantially from application to application. For example, in a wide bus application as shown in FIG. 5*a*, the supply air duct 39 is located near the outer side of the bus, whereas the return air duct 41 is disposed at a substantial distance from the longitudinal center line thereof. In a narrow bus application as shown in FIG. 5*b*, the supply air duct 42 is moved a small distance inwardly from the outer side of the bus, and the return air duct is located adjacent the longitudinal centerline as shown. In a curved-roof bus as shown in FIG. 5*c*, the supply air duct 44 is moved slightly more inwardly from the outer side of the bus, and the return air duct 46 is located in an intermediate position, somewhat outwardly of the longitudinal centerline, but not as far as for a wide bus application.

Of course, in all of the bus applications, a balanced arrangement is provided wherein each side of the bus is provided with both a supply air duct and a return air duct, in a substantially mirror image arrangement as shown. Thus, the modules are usually placed in back-to-back relationship, with the space therebetween being varied to accommodate the individual application requirements. For example, for the wide bus application of FIG. 5*a*, there is a substantial space between the two modules wherein for the narrow bus application of FIG. 5*b*, they are substantially in an abutting relationship. For the curved roof bus application, they are somewhat angled from a true horizontal position, with the spacing therebetween being at an intermediate degree as shown. It should be understood that the three types of installations shown are presented as a sampling of the possible installation requirements, and there are also others that have heretofore required unique designs in order to meet the particular requirements. The present design, on the other hand, provides a single module which will meet the needs of all of the various applications of rooftop air conditioners.

As will be seen, the supply air opening is relatively small, and in each of the three cases described above, the module 11 is placed in such a position that the supply air opening 38 is located substantially over the individual supply air ducts 39, 42 and 44. The return air opening 32, on the other hand in relatively large and therefore can accommodate the various positions of the return air ducts 41, 43 and 46 as shown.

Figure 6:
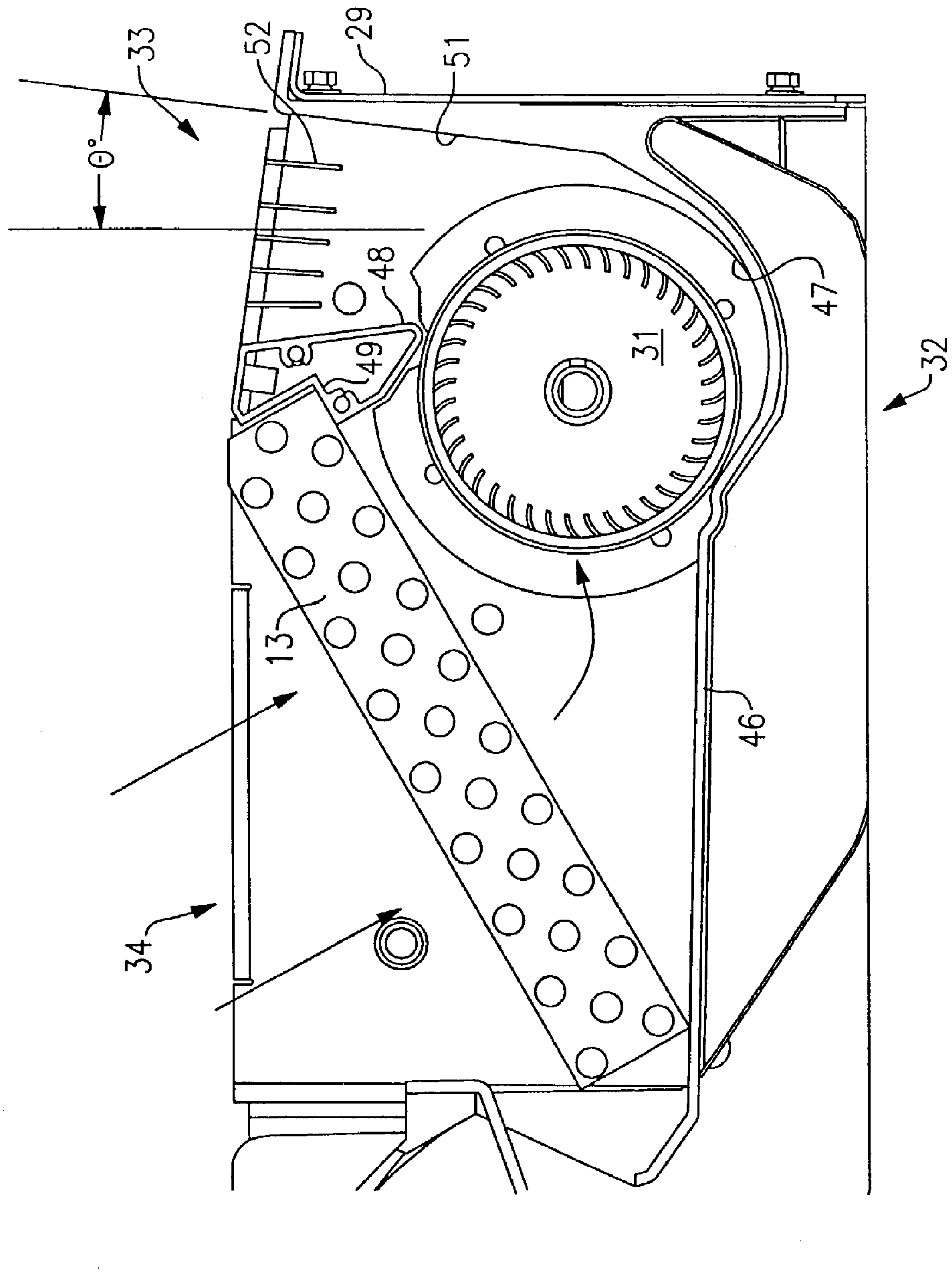
FIG. 6 is a partial side view of the module showing the condenser fan portion thereof.
Figure 3:
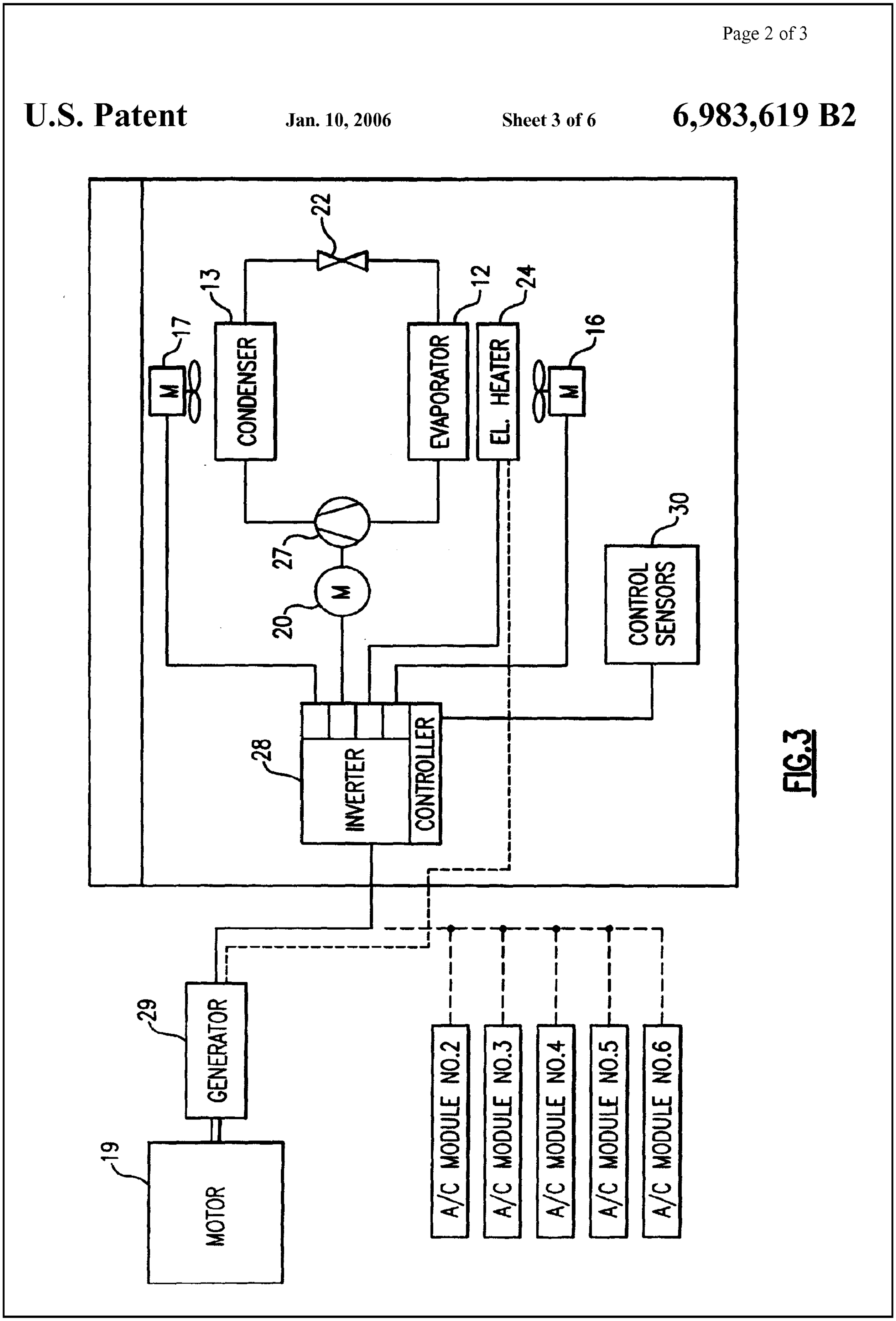
Figures 5A, 5B, 5C:
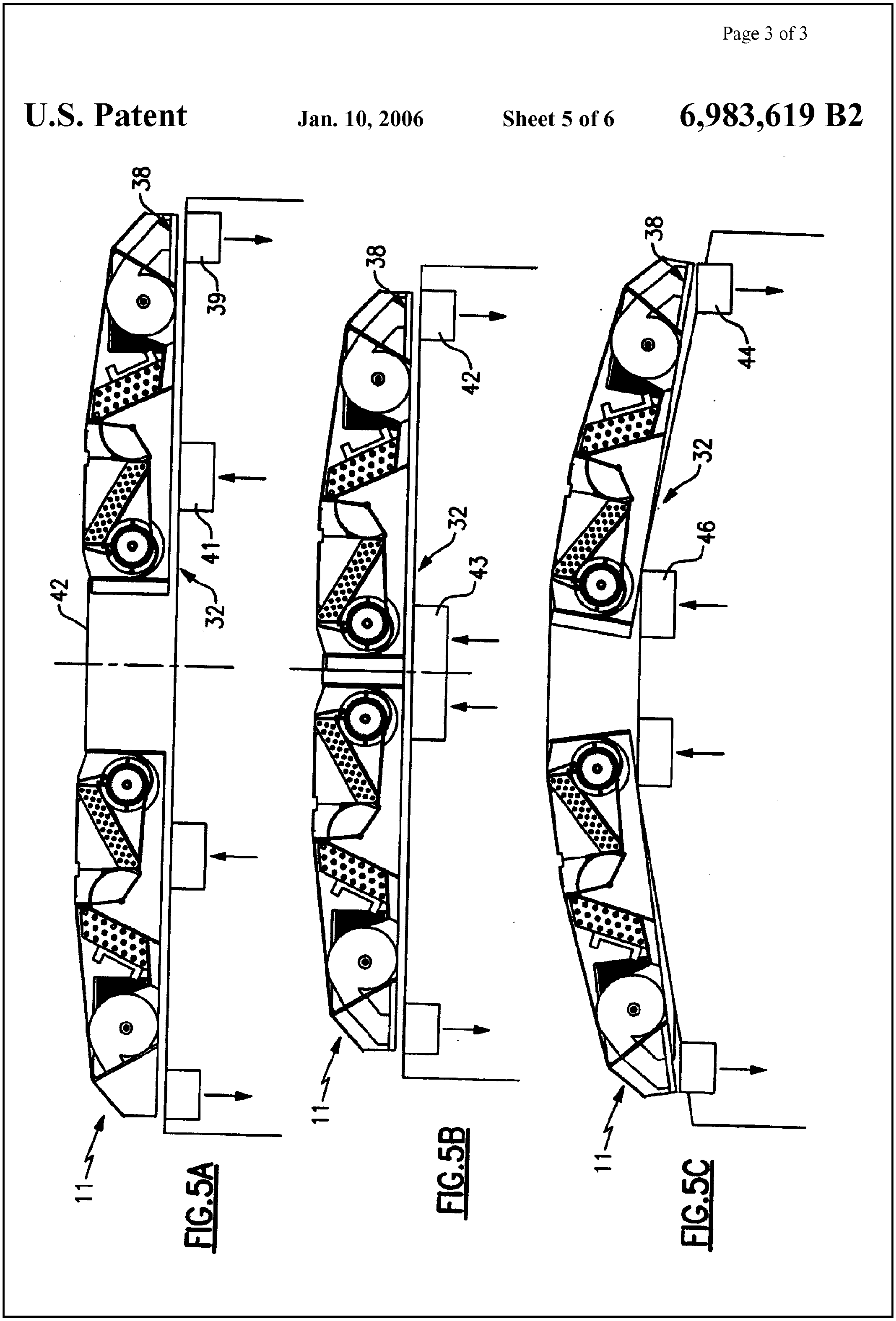

Referring now to FIG. 6, the condenser coil 13 is shown in its upstream position from the transverse fan 31, which is driven by an electrical drive motor 17 as previously described. The transverse fan 31 is operated to cause the air flow in the direction indicated by the arrows. That is, outside air is brought in through the fresh air inlet opening 34, while at the same time a portion of the air may be diverted by way of the flap 36 to include some of the return air that passes through the coil 13. A mixture of the outdoor air and the return air passing through the condenser coil 13 is drawn into the transverse fan 31 and is discharged from the condenser discharge opening 33. Thus, in operation, the transverse fan receives the air mixture coming in substantially horizontally at the left and turns it around 90° to be discharged from the condenser discharge opening 33. This occurs in a relatively quiet and efficient manner, with the drive motor 17 being outside the air flow stream.

The transverse, or tangential, or cross flow fan is forward curved and made to operate in a counterclockwise direction. A suitable fan is a model Q.90×470 RAIU which is commercially available from Puncker Co., Puncker GmBh. A suitable drive motor is a Daewoo Electric Motor Industries Ltd, Model A2931ZA 010–020.

In order for the transverse fan 31 to properly operate, the surrounding structure is provided with certain desirable features. As will be seen, the drain pan 46 located below the condenser coil 13, extends substantially horizontal until it reaches the edge of the transverse fan 31, after which it curves down and around the fan 31 to act as an air guiding wall 47 which approximates the shape of the typical fan housing 31 in the industry.

On the other side of the fan, near the condenser discharge opening 33, a vortex wall 48 is mounted to the coil support structure 49. The purpose of the vortex wall 48 is to divide the low pressure side at the left of the transverse fan from the high pressure side on the right side thereof.

In the applicants early designs of the present invention, the transverse fan 31 and its surrounding structure were so oriented that the discharge flow from the opening 33 was substantially in the vertical direction as indicated by the line. Because of a close proximity of the fresh air inlet opening 34, some of the discharge flow from the opening 33 tended to be drawn over into the opening 34 to thereby be recirculated, which resulted in a loss of efficiency. It was therefore recognized that certain design changes needed to be made.

One design feature that was changed was that of tilting the back wall 51 of the fan housing such that it is not disposed vertically but is at an angle of which is preferably 2 degrees with respect to the vertical plane. Secondly, the fins of the outlet grill were rotated slightly in the clockwise direction in order to change the direction of the air flow therethrough. The result is that the main discharge flow streamline (indicated by the arrow), is tilted backward several degrees to avoid recirculation of the hot air back into the inlet of the condenser.

In addition to the improved features as discussed hereinabove, the present design is aesthetical more pleasing then the large round profiles that are seen with prop fans since the top view of the present design shows only a rather narrow slit, and the fan 31 is essentially hidden from view. Further, because of the relatively small height of the fan 31, the vertical profile is much lower then can be achieved with a propeller fan.

While the present invention has been particularly shown and described with reference to the preferred mode as illustrated in the drawings, it will be understood by one skilled in the art that various changes and detail may be effected therein without departing from the true sprit and scope of the invention as defined by the claims.

We claim:

1. A bus rooftop air conditioner module comprising:

a housing;

an evaporator section disposed in said housing and having a fan for circulating return air from the passenger compartment of a bus, through an evaporator coil to a supply air duct and to the passenger compartment; and a condenser section disposed in said housing and having a condenser coil with a fan for drawing outside air into an inlet opening on one side of a vertical plane and through said condenser coil and discharging it from a discharge opening on the other side of the vertical plane wherein said condenser fan is a tangential fan with its axis disposed horizontally and including a drain pan disposed below said condenser coil and said condenser fan, said drain pan being generally planer in form, but having a portion which is disposed under said fan and is curvilinear in form to act as an air guiding wall for the fan.

2. A bus rooftop air conditioner module as set forth in claim 1 and including a back wall that defines an outer boundary of the air flow stream from the high pressure side of the fan, said back wall being angled away from the vertical plane.

3. A bus rooftop air conditioner module as set forth in claim 1 and including a grill in the condenser discharge opening, said grill having a plurality of fins that are angled away from the vertical plane.

4. A bus rooftop air conditioner module as set forth in claim 1 and including a refrigeration circuit that includes said condensing coil and said evaporator coil, a compressor and an expansion valve.

5. A bus rooftop air conditioner module as set forth in claim 4 and including an inverter electrically connected to said compressor and to drive motors for said condenser and evaporator fans.

6. A bus rooftop air conditioner module as set forth in claim 1 wherein said module is adaptable to be mounted in tandem on the bustop with an identical module, with each extending transversely from a point near a longitudinal centerline of the bus to a point near its outer side.

7. An air conditioning module for installation on a bus having a supply air duct for conducting the flow of conditioned air to a passenger compartment and for conducting the flow of stale air from the passenger compartment, comprising:

a housing for selective placement on the bus and having a supply air outlet opening being disposed adjacent the supply air duct and a return air intake opening disposed adjacent the return air duct;

an evaporator coil disposed in said housing and having an associated fan for circulating return air from said return air intake opening, through said evaporator coil and outside supply air duct; and a condenser coil disposed in said housing and having an associated fan for circulating fresh air from a condenser fresh air intake opening in said housing, through said condenser coil and out a condenser outlet air opening; wherein said associated fan is a transverse fan positioned adjacent said condenser air outlet opening including a drain pan located below said condenser coil and fan, said drain pan being substantially planer in form but having a curvilinear portion disposed under the fan to act as a guiding wall for the air flowing through said fan.

8. An air conditioning module as set forth in claim 7 wherein said condenser fresh air intake opening is adjacent said condenser outlet air opening with said openings being separated by a vertical plane therebetween and further wherein said housing includes a wall on a downstream side of said fan, with said wall being disposed at an angle from the vertical plane so as to facilitate the discharge flow at an angle from said vertical plane.

9. An air conditioning module as set forth in claim 8 and including a grill disposed in said condenser outlet air opening, said grill having a plurality of fins which are disposed at an angle with respect to a vertical plane to thereby facilitate the discharge of flow at an angle from the vertical plane.

* * * * *

UNITED STATES PATENT AND TRADEMARK OFFICE

CERTIFICATE OF CORRECTION

PATENT NO. : 6,983,619 B2

APPLICATION NO. : 10/429453

DATED : January 10, 2006

INVENTOR(S) : Andreas Hille et al.

It is certified that error appears in the above-identified patent and that said Letters Patent is hereby corrected as shown below:

In FIG. 3 numeral 30 has been added

In FIG. 3 numeral 18 is changed to numeral 27

In FIGS. 5A, 5B, and 5C, numeral 11 has been added

Column 5 line 8 "in" will be changed to --is--

Column 5 line 17 "of the flap 36 to include some of the return air that passes" will be changed to --of the flap 36 as previously described, to include some of the return air that passes--

Column 5 line 58 "vertically but is at an angle of which is preferably 2 degrees" will be changed to --vertically but is at an angle of 0 which is preferably 2 degrees--

Signed and Sealed this

Third Day of October, 2006

JON W. DUDAS

*Director of the United States Patent and Trademark Office*